United States Patent
Cho

(10) Patent No.: US 9,478,078 B2
(45) Date of Patent: Oct. 25, 2016

(54) INSPECTION MANAGING APPARATUS, INSPECTION SYSTEM, AND INSPECTION METHOD FOR INTEGRATED MULTIMEDIA OF VEHICLE

(71) Applicant: HYUNDAI MOTOR COMPANY, Seoul (KR)

(72) Inventor: Joon Kwon Cho, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 60 days.

(21) Appl. No.: 14/554,030

(22) Filed: Nov. 25, 2014

(65) Prior Publication Data

US 2015/0348338 A1 Dec. 3, 2015

(30) Foreign Application Priority Data

May 30, 2014 (KR) ........................ 10-2014-0066367

(51) Int. Cl.
| | |
|---|---|
| *G07C 5/08* | (2006.01) |
| *H04W 24/00* | (2009.01) |
| *G05B 23/02* | (2006.01) |
| *H04L 29/08* | (2006.01) |
| *G07C 5/00* | (2006.01) |

(52) U.S. Cl.
CPC .............. *G07C 5/08* (2013.01); *G05B 23/021* (2013.01); *G07C 5/0808* (2013.01); *H04L 67/12* (2013.01); *H04W 24/00* (2013.01); *G07C 5/008* (2013.01); *G07C 2205/02* (2013.01)

(58) Field of Classification Search
None
See application file for complete search history.

(56) References Cited

U.S. PATENT DOCUMENTS

| | | | | |
|---|---|---|---|---|
| 2006/0262103 | A1* | 11/2006 | Hu | G06F 3/023 345/173 |
| 2009/0292416 | A1* | 11/2009 | Ubik | H04W 24/00 701/32.8 |
| 2012/0029762 | A1* | 2/2012 | Ubik | G07C 5/008 701/29.6 |
| 2012/0095643 | A1* | 4/2012 | Bose | B60K 37/00 701/32.8 |
| 2014/0195101 | A1* | 7/2014 | Chen | G06F 17/30522 701/29.6 |
| 2015/0072555 | A1* | 3/2015 | Riddiford | F16M 11/041 439/575 |
| 2015/0097652 | A1* | 4/2015 | Ishida | B60R 25/04 340/5.61 |

FOREIGN PATENT DOCUMENTS

| | | |
|---|---|---|
| KR | 1020120009189 A | 2/2012 |
| KR | 1020130094615 A | 8/2013 |

* cited by examiner

*Primary Examiner* — John R Olszewski
*Assistant Examiner* — James M McPherson
(74) *Attorney, Agent, or Firm* — McDermott Will & Emery LLP

(57) ABSTRACT

An inspection system for an integrated multimedia of a vehicle includes: a wireless connector mounted in the vehicle; and a communication terminal requesting pairing with the integrated multimedia of the vehicle through a short range wireless communication using the wireless connector, and determining at least one of whether a phonebook is transmitted, whether a call sound is transmitted and received, and whether short range wireless communication is performed, by inspecting the integrated multimedia for the vehicle in the state in which the communication terminal is paired with the integrated multimedia of the vehicle through the short range wireless communication.

18 Claims, 6 Drawing Sheets

INSPECTION MANAGING APPARATUS, INSPECTION SYSTEM, AND INSPECTION METHOD FOR INTEGRATED MULTIMEDIA OF VEHICLE

CROSS-REFERENCE TO RELATED APPLICATION

This application claims the benefit of priority to Korean Patent Application No. 10-2014-0066367 filed in the Korean Intellectual Property Office on May 30, 2014, the entire contents of which are incorporated herein by reference.

FIELD OF THE INVENTION

The present disclosure relates to an inspection system for an integrated multimedia of a vehicle, and more particularly, to an inspection managing apparatus, an inspection system, and an inspection method in which a short range wireless communication and speech recognition function of an integrated multimedia of a vehicle is inspected using an inspection process.

BACKGROUND

Recently, due to the significant development of electronic devices, control of the electronic devices plays an important role in improving performance of a vehicle. The developed electronic devices have been applied to a safety apparatus for substantially driving an engine or promoting safety of a driver, several additional pieces of equipment for a driver's convenience, a driving apparatus, and the like.

For driver's convenience and a comfortable driving state, integrated multimedia of a vehicle in which audio video navigation (AVN) is integrated has been rapidly distributed recently.

The integrated multimedia of the vehicle is a device in which an audio device, a video device, a navigation device, and the like are integrated within the vehicle and may be accessed through a common user interface, and provide an audio service such as radio and CD, a video service such as DVD, a navigation service such as a destination guide function, and the like.

The integrated multimedia of the vehicle is configured to share a speaker, a display device, a key input unit, and the like which are user interfaces for the audio service, the video service, and the navigation service. Compared to a case in which the audio device, the video device, and the navigation device are individually provided, the integrated multimedia of the vehicle has several advantages, such as removal of overlapping parts, driver's operation convenience, and an integrated service.

Further, the integrated multimedia of the vehicle supports a handsfree call of mobile communication terminals such as a smart phone within the vehicle to help a driver talk on the phone while driving. To this end, the integrated multimedia of the vehicle includes a communication device which may perform short range wireless communication such as Bluetooth to allow the driver to conveniently perform communications in a handsfree mode.

A quality problem of the short range wireless communication and speech recognition function of the integrated multimedia of the vehicle among quality problems relating to a recently emerging vehicle electronic technology is on the increase. A need exists to improve the quality problem and the like.

However, it is difficult to completely solve the above problem only by improvement of the technology, so it is necessary to perform inspection in a vehicle state in which assembling is completed. However, according to the existing inspection method, an inspector manually performs all the operations which control the terminal providing the short range wireless communication and the integrated multimedia of the vehicle so as to perform the inspection. Therefore, since the existing inspection method involves complicated manual operations for performing the inspection and a long inspection time, the existing inspection method omits or simplifies the inspection and therefore does not normally perform the inspection.

The above information disclosed in this Background section is only for enhancement of understanding of the background of the invention and therefore it may contain information that does not form the prior art that is already known in this country to a person of ordinary skill in the art.

SUMMARY

An aspect of the present inventive concept provides an inspection managing apparatus, an inspection system, and an inspection method for integrated multimedia of a vehicle capable of inspecting a short range wireless communication and speech recognition function of the integrated multimedia apparatus of the vehicle using an inspection process.

Another aspect of the present inventive concept provides an inspection managing apparatus, an inspection system, and an inspection method for integrated multimedia of a vehicle capable of automatically inspecting the integrated multimedia of the vehicle by fixing a communication terminal to the vehicle.

Still another aspect of the present inventive concept encompasses an inspection managing apparatus, an inspection system, and an inspection method for integrated multimedia of a vehicle capable of storing and managing an inspection result of the integrated multimedia of the vehicle in a communication terminal.

An exemplary embodiment of the present inventive concept relates an inspection system for integrated multimedia of a vehicle, including: a wireless connector mounted in the vehicle; and a communication terminal requesting pairing with the integrated multimedia of the vehicle through a short range wireless communication using the wireless connector, and determining at least one of whether a phonebook is transmitted, whether a call sound is transmitted and received, and whether short range wireless communication is performed, by inspecting the integrated multimedia of the vehicle in the state in which the communication terminal is paired with the integrated multimedia of the vehicle through the short range wireless communication.

Another exemplary embodiment of the present inventive concept provides an inspection managing apparatus for integrated multimedia of a vehicle, including: a wireless connector mounted in the vehicle; a docking station mounted in the vehicle; and a communication terminal mounted in the docking station, requesting pairing with the integrated multimedia of the vehicle through the short range wireless communication using the wireless connector, and inspecting the integrated multimedia of the vehicle in a state in which the communication terminal is paired with the integrated multimedia of the vehicle through the short range wireless communication.

Yet another exemplary embodiment of the present inventive concept provides an inspection method for integrated multimedia of a vehicle by a communication terminal, including: requesting pairing with the integrated multimedia of the vehicle through short range wireless communication using a wireless connector; when the pairing is accepted through the short range wireless communication, performing the pairing with the integrated multimedia of the vehicle through the short range wireless communication; transmitting a phonebook list to the integrated multimedia of the vehicle to determine whether a phonebook may be transmitted; outputting a first inspection speech in a call connected state with an arbitrary telephone number in the phonebook list and determining whether a call sound is transmitted and received based on the first inspection speech; outputting a second inspection speech to the integrated multimedia of the vehicle through the short range wireless communication and determining whether the short range wireless communication may be performed based on the second inspection speech; and releasing pairing with the integrated multimedia of the vehicle through the short range wireless communication.

According to the inspection managing apparatus, the inspection system, and the inspection method for the integrated multimedia of the vehicle according to the exemplary embodiments of the present inventive concept, it is possible to automatically inspect the short range wireless communication and speech recognition function of the integrated multimedia apparatus of the vehicle using the inspection process, thereby rapidly and accurately performing the inspection.

Further, according to the inspection managing apparatus, the inspection system, and the inspection method for the integrated multimedia of the vehicle according to the exemplary embodiments of the present inventive concept, it is possible to previously prevent the field leakage which is the quality problem relating to the short range wireless communication and speech recognition function by inspecting the integrated multimedia within the completed vehicle.

Further, according to the inspection managing apparatus, the inspection system, and the inspection method for the integrated multimedia of the vehicle according to the exemplary embodiments of the present inventive concept, it is possible to store and manage the inspection result of the integrated multimedia of the vehicle in the communication terminal, thereby facilitating the inspection history management.

Further, the effects which may be obtained or predicted by the exemplary embodiment of the present inventive concept will be directly or implicitly disclosed in the detailed description.

DETAILED DESCRIPTION OF THE EMBODIMENTS

Hereinafter, an operation principle of an inspection managing apparatus, an inspection system, and an inspection method for an integrated multimedia of a vehicle according to an exemplary embodiment of the present inventive concept will be described in detail with reference to the description and the accompanying drawings. However, the drawings and the detailed description relate to one exemplary embodiment among several exemplary embodiments for effectively describing features of the present invention inventive concept. Therefore, the present inventive concept is not limited only to the drawings and description.

Further, in describing below exemplary embodiments of the present i inventive concept, the related well-known functions or constructions will not be described in detail since they may unnecessarily obscure the understanding of the present inventive concept. Further, the following terminologies are defined in consideration of the functions in the present inventive concept and may be construed in different ways by the intention of users and operators, practice, or the like. Therefore, the definitions thereof should be construed based on the contents throughout the specification.

Further, to effectively describe core technical features of the present invention, terms may be appropriately changed, integrated, or separated for those skilled in the art in a technical field to which the present inventive concept belongs to explicitly understand the present invention, but the present invention is not limited thereto.

Hereinafter, one exemplary embodiment of the present inventive concept will be described in detail with reference to the accompanying drawings.

Figure 1:
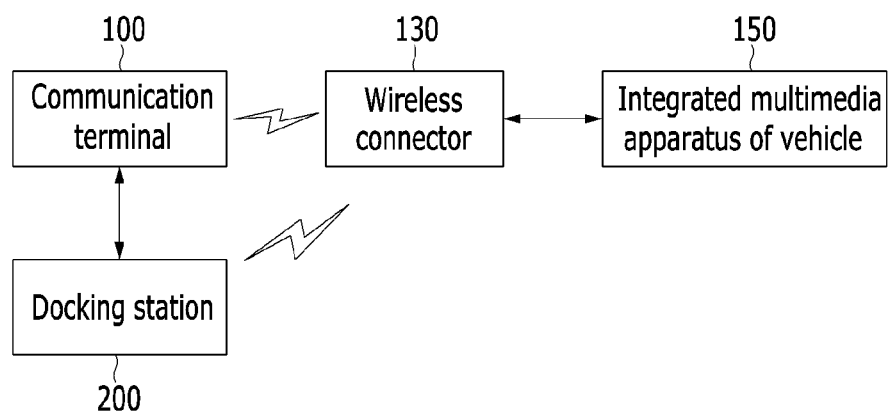
FIG. 1 is a diagram schematically illustrating an inspection system for integrated multimedia of a vehicle according to an exemplary embodiment of the present inventive concept.

FIG. 1 is a diagram schematically illustrating an inspection system for integrated multimedia of a vehicle according to an exemplary embodiment of the present inventive concept.

Referring to FIG. 1, an inspection system for integrated multimedia of a vehicle includes a communication terminal 100 and a wireless connector 130. The inspection system is connected to the integrated multimedia of a vehicle (hereinafter referred to as "integrated multimedia" 150).

The communication terminal 100 is mounted in the vehicle through a docking station 200 to inspect the integrated multimedia 150. The docking station 200 will be described in detail with reference to FIG. 2.

The communication terminal 100 is connected to the wireless connector 130 to request address information on the integrated multimedia 150, and is connected to the integrated multimedia 150 by using the address information on the integrated multimedia 150 which is received from the wireless connector 130.

The communication terminal 100 may be connected to the integrated multimedia 150 through a short range wireless communication. Herein, the short range wireless communication may be at least one of Bluetooth, infrared data association (IrDA), WiFi, wireless LAN, radio frequency (RF), near field communication (NFC), and ZigBee.

The communication terminal 100 transmits a phonebook list to the integrated multimedia 150 to determine whether the phonebook may be transmitted.

The communication terminal 100 connects a call using an arbitrary phone number of the phonebook list, outputs first inspection speech to the integrated multimedia 150 in a call connected state, and receives the first inspection speech from the integrated multimedia 150. The communication terminal 100 uses the output first inspection speech and the received first inspection speech to determine whether a call sound may be transmitted and received.

The communication terminal 100 outputs a second inspection speech in the state in which the communication terminal 100 is paired with the integrated multimedia 150 through the short range wireless communication, and receives the second inspection speech from the integrated multimedia 150. The communication terminal 100 uses the output second inspection speech and the received second inspection speech to determine whether the short range wireless communication may be performed.

The inspection method of the integrated multimedia 150 in the communication terminal 100 will be described in more detail with reference to FIGS. 4 to 6.

When the communication terminal 100 performs communication while being connected to the wireless connector 130 and the integrated multimedia 150, the communication terminal 100 has various forms. For example, the communication terminal 100 may be any one of a mobile phone which may perform voice communication or image communication, such as a wideband CDMA (WCDMA) phone and a smart phone, a tablet PC, an e-book, and a personal digital assistants (PDA).

The wireless connector 130 is mounted in the vehicle and is connected to the communication terminal 100 and the integrated multimedia 150. That is, when the wireless connector 130 is mounted in the vehicle, the wireless connector 130 requests a connection of the integrated multimedia 150, and when the connection is accepted, the wireless connector 130 may be connected to the integrated multimedia 150 through a controller area network (CAN) communication network.

The wireless connector 130 is connected to the communication terminal 100 through the short range wireless communication.

The wireless connector 130 receives an address information request of the integrated multimedia 150 from the communication terminal 100, and requests the address information of the integrated multimedia 150. The wireless connector 130 receives the address information from the integrated multimedia 150 and transmits the received address information of the integrated multimedia 150 to the communication terminal 100.

The wireless connector 130 may be a wireless on-board diagnostics (OBD) connector.

The integrated multimedia 150 is mounted in the vehicle and may be configured by integrating an audio video navigation (AVN).

The integrated multimedia 150 is connected to the wireless connector 130 and the communication terminal 100. That is, the integrated multimedia 150 may be connected to the wireless connector 130 through the CAN communication network. The integrated multimedia 150 may be connected to the communication terminal 100 through the short range wireless communication.

The integrated multimedia 150 receives the phonebook list from the communication terminal 100 in the state in which the integrated multimedia 150 is paired with the communication terminal 100 through the short range wireless communication. The integrated multimedia 150 may display the received phone book list on a screen.

The integrated multimedia 150 receives the inspection speech in the state in which the integrated multimedia 10 is paired with the communication terminal 100 through the short range wireless communication and transmits the received inspection speech to the communication terminal 100.

The integrated multimedia 150 releases the pairing with the communication terminal through the short range wireless communication when the inspection in the communication terminal 100 is completed.

Figure 2:
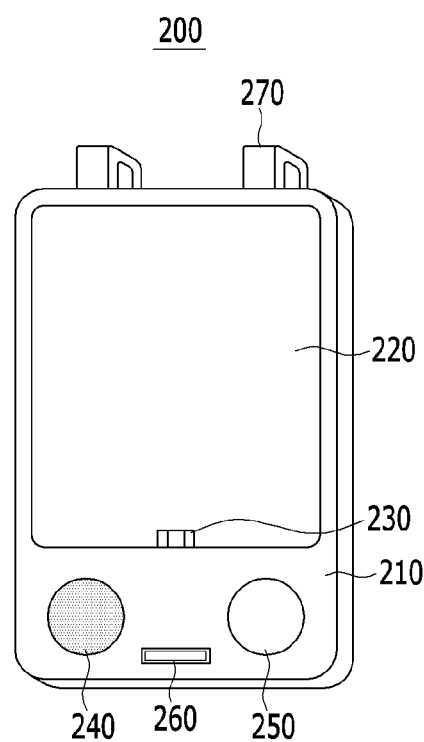
FIG. 2 is a diagram illustrating a docking station according to an exemplary embodiment of the present inventive concept.

FIG. 2 is a diagram illustrating a docking station according to an exemplary embodiment of the present inventive concept.

Referring to FIG. 2, a docking station 200 includes a main body 210, a seating part 220, a connection terminal 230, a speaker 240, a microphone 250, a code recognition unit 260, and a stand 270.

The main body 210 is provided with the seating part 220, the connection terminal 230, the speaker 240, the microphone 250, the code recognition unit 260, and the stand 270.

The main body 210 may have a quadrangle shape, but is not limited thereto, but has a different shape. For example, the main body 210 may have a polygon, a circle, and an oval shape.

The seating part 220 is formed in the main body 210 and is provided with the communication terminal 100. The seating part 220 may be formed in a groove form in the main body 210 so as to be provided with the communication terminal 100.

A size of the seating part 220 may be differently formed depending on a size of an outer side of the communication terminal 100.

The connection terminal 230 is formed at a lower end of the seating part 220. The connection terminal 230 is inserted into the communication terminal 100 to fix the communication terminal 100 to the seating part 220. The connection terminal 230 connects among the communication terminal 100, the speaker 240, and the microphone 250.

The speaker 240 is formed at one side of the main body 210. For example, the speaker 240 may be formed at the lower end of the seating part 220, but may be formed at another location. That is, the location of the speaker 240 in the main body 210 is not limited.

The speaker 240 may output the inspection speech under the control of the communication terminal 100 connected through the connection terminal 230.

The microphone 250 is formed at one side of the main body 210. For example, the microphone 250 may be formed at the lower end of the seating part 220 and may be formed to be symmetrical with the speaker 240, but is not limited thereto. That is, the location of the microphone 250 in the main body 210 is not limited.

The microphone 250 receives the inspection speech output from the outside, and may provide the received inspection speech to the communication terminal 100 through the connection terminal 230 under the control of the communication terminal 100.

The code recognition unit 260 is formed in the main body 210 and recognizes an identification code of the vehicle. The code recognition unit 260 may provide the recognized identification code to the communication terminal 100 through the connection terminal 230.

The code recognition unit 260 may be formed at the lower end of the main body 210 at which the speaker 240 and the microphone 250 are formed, but is not limited thereto. That is, the location of the code recognition unit 260 in the main body 210 is not limited.

The stand 270 fixes the main body 210 to the vehicle. The stand 270 may be formed to be locked to a handle of the vehicle.

The stand 270 is formed on an upper portion of the main body 210 and may be formed of two thereof, but is not limited thereto. That is, when the stand 270 fixes the main body 210 to the vehicle, the stand 270 may also be formed at a lower portion of the main body 210, both sides of the main body 210, and upper and lower portions of the main body 210, and when the stand 270 fixes the main body 210 to the vehicle, the number of stands 270 is not limited.

Figure 3:
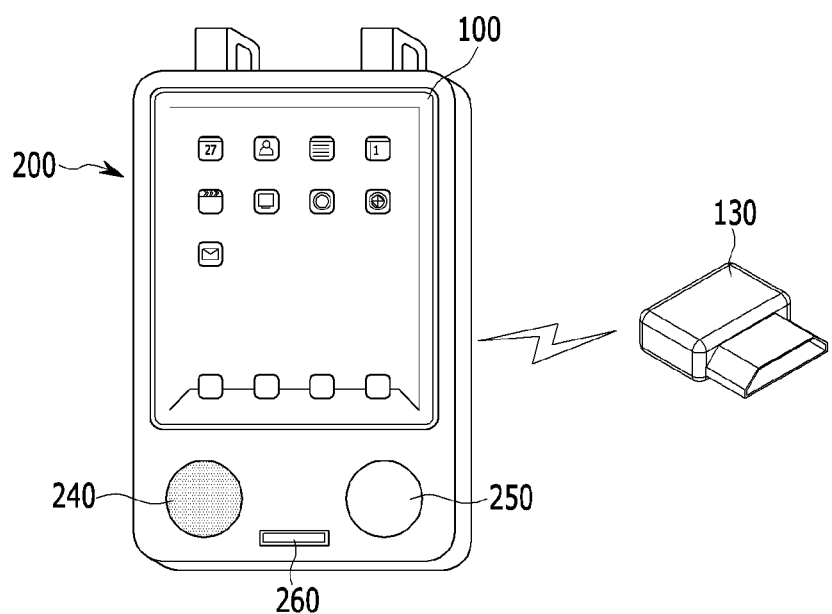
FIG. 3 is a diagram illustrating an inspection managing apparatus for integrated multimedia of a vehicle according to an exemplary embodiment of the present inventive concept.

FIG. 3 is a diagram illustrating an inspection managing apparatus for integrated multimedia of a vehicle according to an exemplary embodiment of the present inventive concept.

Referring to FIG. 3, the inspection managing apparatus includes the communication terminal 100, the docking station 200, and the wireless connector 130.

The communication terminal 100 is mounted in the docking station 200 and may control the speaker 240, the microphone 250, and the code recognition unit 260 of the docking station 200 to inspect the integrated multimedia 150.

In other words, the communication terminal 100 recognizes the identification code of the vehicle through the code recognition unit 260. Here, the identification code of the vehicle may be a vehicle identification number (VIN) of the vehicle. For example, the identification code may be a one-dimensional barcode or a two-dimensional barcode. The two-dimensional barcode may be one of a quick response (QR) code, a Maxi code, a data matrix code, and PDF417.

When the communication terminal 100 requests a connection with the integrated multimedia 150 through the wireless connector 130 and receives acceptance for the connection request from the wireless connector 130, the communication terminal 100 is paired with the integrated multimedia 150 through the short range wireless communication.

The communication terminal 100 outputs the inspection speech through the speaker 240 of the docking station 200, and receives the inspection speech through the microphone 250. The communication terminal 100 compares the output inspection speech and the received inspection speech to determine whether the call sound may be transmitted and received, whether the short range wireless communication may be performed, and whether the communication may be performed through the short range wireless communication.

The communication terminal 100 stores inspection results for each identification code of the vehicle to be able to manage an inspection history.

The docking station 200 fixes the communication terminal 100 to the vehicle. The docking station 200 includes the speaker 240 outputting the inspection speech, the microphone 250 receiving the inspection speech, and the code recognition unit 260 recognizing the identification code of the vehicle under the control of the communication terminal.

The wireless connector 130 is mounted in the vehicle, and is connected to the communication terminal 100 and the integrated multimedia 150. The wireless connector 130 receives the address information request of the integrated multimedia 150 from the communication terminal 100, and requests the address information of the integrated multimedia 150. The wireless connector 130 receives the address information from the integrated multimedia 150 and transmits the received address information to the communication terminal 100.

Figure 4:
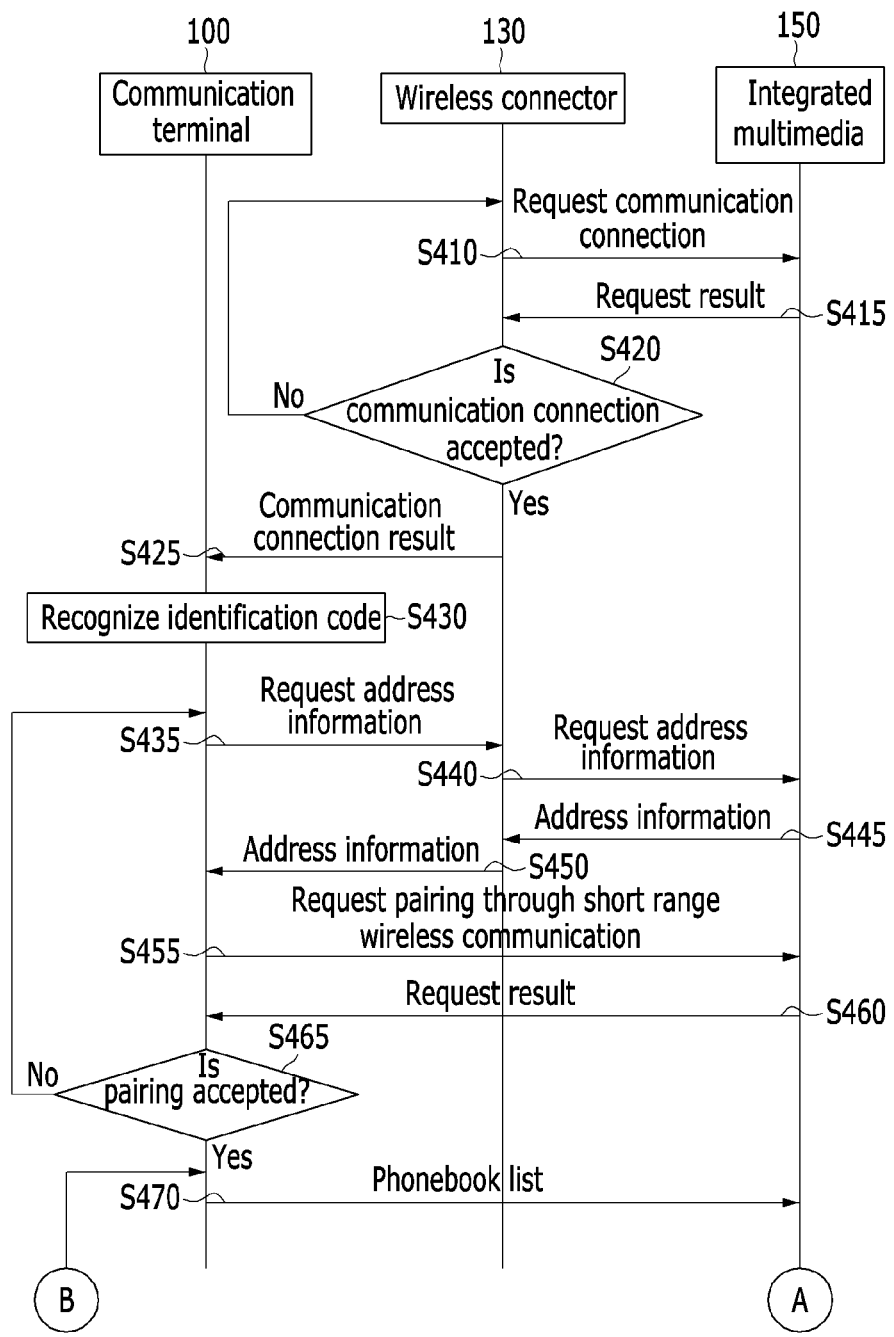
FIGS. 4 to 6 are flowcharts illustrating an inspection method for an integrated multimedia of a vehicle according to an exemplary embodiment of the present inventive concept.
Figure 5:
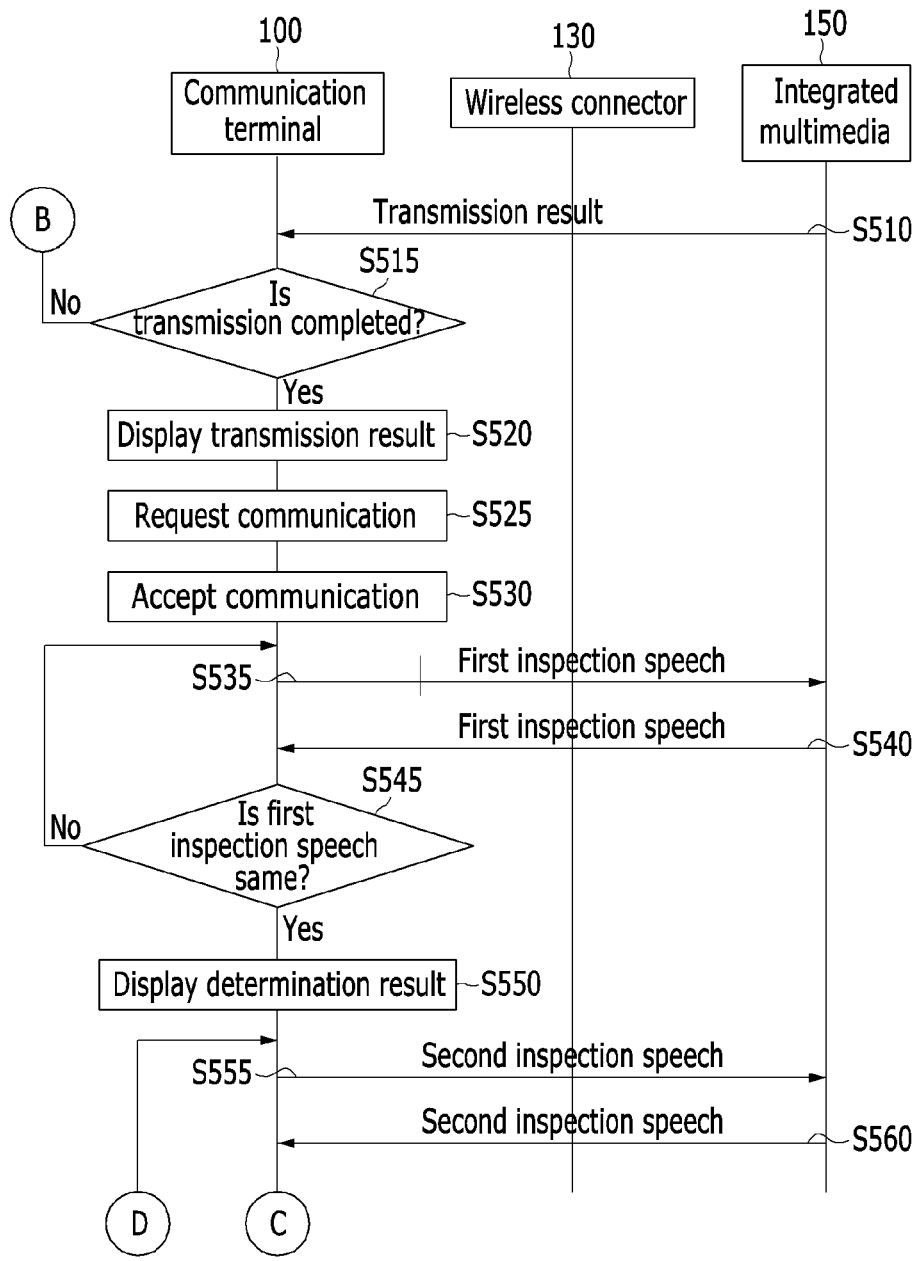
Figure 6:
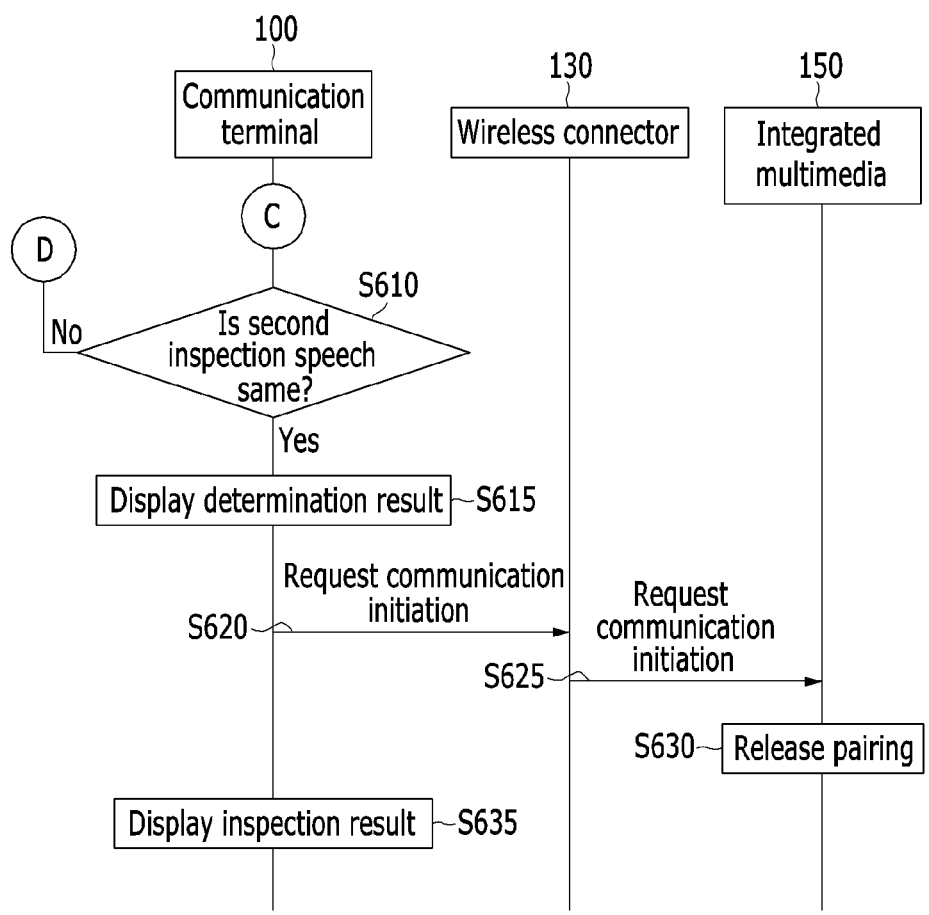

FIGS. 4 to 6 are flowcharts illustrating an inspection method for integrated multimedia of a vehicle according to an exemplary embodiment of the present inventive concept.

Referring to FIGS. 4 to 6, the wireless connector 130 is mounted in the vehicle. It is determined that the wireless connector 130 is mounted in the vehicle, and the wireless connector 130 requests the communication connection of the integrated multimedia 150 which is formed in the vehicle (S410).

The integrated multimedia 150 receives a communication establishment request from the wireless connector 130, and accepts the communication connection to transmit the request result to the wireless connector 130 (S415).

The wireless connector 130 determines whether the request result is the acceptance of the communication request (S420).

When the communication request is not accepted, the wireless connector 130 returns to step S410 to again request the communication connection.

When the communication request is accepted, the wireless connector 130 is connected to the integrated multimedia 150 through the CAN communication network. The wireless connector 130 is connected to the communication terminal 100 through the short range wireless communication. The wireless connector 130 transmits the communication connection result that the wireless connector 130 is communication-connected to the integrated multimedia 150 to the communication terminal 100 (S425).

The communication terminal 100 recognizes the identification code of the vehicle through the code recognition unit 260 of the docking station 200 (S430). Further, when an operator selects a start button, the communication terminal 100 confirms the input for the start button and starts the inspection of the integrated multimedia 150.

The communication terminal 100 requests the address information on the integrated multimedia 150 of the wireless connector 130 so that the communication terminal 100 is connected to the integrated multimedia 150 through the short range wireless communication (S435). In this case, the address information may be a media access control (MAC) address.

The wireless connector 130 receives the address information request from the communication terminal 100 and requests the address information of the integrated multimedia 150 (S440).

The integrated multimedia 150 transmits the address information to the wireless connector 130 (S445).

The wireless connector 130 receives the address information from the integrated multimedia 150 and transmits the received address information on the integrated multimedia 150 to the communication terminal 100 (S450).

The communication terminal 100 receives the address information on the integrated multimedia 150 from the wireless connector 130, and requests the pairing with the integrated multimedia 150 through the short range wireless communication using the address information (S455).

The integrated multimedia 150 receives the pairing request from the communication terminal 100 and transmits the request result for the pairing request to the communication terminal 100 (S460). The integrated multimedia 150 may transmit the request result accepting the pairing request to the communication terminal 100.

The communication terminal 100 receives the request result from the integrated multimedia 150 and determines whether the request result corresponds to the acceptance of pairing (S465).

When the pairing request is not accepted or the request result is not received, the communication terminal 100 returns to step S435 to again request the address information on the integrated multimedia 150 of the wireless connector 130.

When the pairing request is accepted, the communication terminal 100 is paired with the integrated multimedia 150 through the short range wireless communication. The communication terminal 100 transmits the phonebook list to the integrated multimedia 150 through the short range wireless communication (S470). In this case, the phonebook list may include at least one phone number.

The integrated multimedia 150 receives the phonebook list from the communication terminal 100, and transmits a transmission result to the communication terminal 100 to inform the communication terminal 100 that the phonebook list is received (S510).

The communication terminal 100 determines whether the transmission result is the transmission completion of the phonebook list (S515).

When the transmission of the phonebook list is not completed, the communication terminal 100 returns to step S470 to again transmit the phonebook list to the integrated multimedia 150.

When the transmission of the phonebook list is completed, the communication terminal 100 displays the transmission result that the integrated multimedia 150 receives the phonebook list on the screen (S520). In this case, the communication terminal 100 may store the transmission result for the phonebook list.

The communication terminal 100 requests a call using an arbitrary phone number of the phonebook list (S525).

The communication terminal 100 accepts a call through the short range wireless communication (S530).

The communication terminal 100 transmits the first inspection speech to the microphone of the vehicle through the speaker 240 of the docking station in the call connected state (S535). In this case, the communication terminal 100 releases the pairing with the integrated multimedia through the short range wireless communication and outputs the first inspection speech, and then performs the pairing with the integrated multimedia through the short range wireless communication again.

The integrated multimedia 150 recognizes the first inspection speech received by the microphone of the vehicle, and transmits the first inspection speech to the communication terminal 100 through the short range wireless communication (S540).

The communication terminal 100 receives the first inspection speech through the short range wireless communication, and compares the output first inspection speech with the received first inspection speech to determine whether the output first inspection speech is the same as the received first inspection speech (S545).

When the communication terminal 100 compares the output first inspection speech with the received first inspection speech to determine whether the output first inspection speech is the same as the received first inspection speech, the communication terminal 100 displays the determination result on the screen (S550). That is, when the communication terminal 100 compares the output first inspection speech with the received first inspection speech to determine whether the output first inspection speech is the same as the received first inspection speech, the communication terminal may determine that the call and the call sound may be transmitted and received and may display the determination result on the screen. Further, when the communication terminal 100 compares the output first inspection speech with the received first inspection speech to determine whether the output first inspection speech is the same as the received first inspection speech, the communication terminal outputs the first inspection speech through the microphone of the vehicle and therefore may confirm the performance of the microphone of the vehicle. Further, the communication terminal 100 may store the determination result for the identification code of the vehicle.

When the output first inspection speech is not the same as the received first inspection speech, the communication terminal 100 returns to step S540 to again transmit the first inspection speech to the integrated multimedia 150.

The communication terminal 100 outputs the second inspection speech through the speaker 240 of the docking station 200 in the state in which the communication terminal 100 is paired with the integrated multimedia through the short range wireless communication (S555). In this case, the communication terminal 100 releases the pairing with the integrated multimedia through the short range wireless communication and outputs a second inspection speech, and then performs the pairing with the integrated multimedia through the short range wireless communication again.

The integrated multimedia 150 receives the second inspection speech through the short range wireless communication and outputs the second inspection speech through the speaker of the vehicle (S560).

The communication terminal 100 compares the output second inspection speech with the received second inspection speech to determine whether the output second inspection speech is the same as the received second inspection speech (S610).

When the output second inspection speech is not the same as the received second inspection speech by comparing the output second inspection speech with the received second inspection speech, the communication terminal 100 returns to step S555 to again transmit the second inspection speech to the integrated multimedia 150.

When the communication terminal 100 compares the output second inspection speech with the received second inspection speech to determine whether the output second inspection speech is the same as the received second inspection speech, the communication terminal 100 displays the determination result on the screen (S615). That is, when the output second inspection speech is the same as the received second inspection speech by comparing the output second inspection speech with the received second inspection speech, the communication terminal 100 may determine that the short range wireless communication may be performed and performs the comparison based on the inspection speech output through the speaker of the vehicle to be able to confirm the performance of the speaker of the vehicle. Further, the communication terminal 100 may store the determination result for the identification code of the vehicle.

The communication terminal 100 requests initialization of the short range wireless communication of the wireless connector 130 (S620).

The wireless connector 130 receives the communication initialization request from the communication terminal 100 and transmits the communication initialization request to the integrated multimedia 150 (S625).

The integrated multimedia 150 releases the pairing with the communication terminal 100 through the short range wireless communication (S630).

The communication terminal 100 displays the inspection result including the plurality of determination results corresponding to the identification code of the vehicle (S635). Further, the communication terminal 100 may also transmit the inspection result corresponding to the identification code to the upper managing apparatus which manages the communication terminal 100. Therefore, the operator may also confirm the inspection result of inspection for each vehicle by the upper managing apparatus, and therefore the operation management may be easily performed.

Further, the operator separates the docking station 200 in which the wireless connector 130 and the communication terminal 100 are mounted from the vehicle, and then may complete the inspection.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An inspection system for integrated multimedia of a vehicle, comprising:
   a wireless connector mounted in the vehicle; and
   a communication terminal (i) requesting pairing with the integrated multimedia of the vehicle through a short range wireless communication using the wireless connector, and (ii) determining at least one of whether a phonebook is transmitted, whether a call sound is transmitted and received, and whether short range wireless communication is performed, by inspecting the integrated multimedia for the vehicle while the communication terminal is paired with the integrated multimedia of the vehicle through the short range wireless communication,
   wherein the communication terminal (i) requests a call using an arbitrary phone number in a phonebook list, (ii) accepts a call through the short range wireless communication, (ii) outputs a first inspection speech to the microphone of the vehicle through the speaker of the docking station in a call connected state, (iv) receives the first inspection speech through the microphone of the docking station in the state in which the communication terminal is paired with the integrated multimedia through the short range wireless communication, and (v) compares the output first inspection speech with the received first inspection speech to determine whether the call sound is transmitted and received.

2. The inspection system of claim 1, further comprising:
   a docking station on which the communication terminal is mounted and which fixes the communication terminal to the vehicle.

3. The inspection system of claim 2, wherein
   the docking station includes:
   a speaker outputting inspection speech under control of the communication terminal; and
   a microphone receiving the inspection speech from the integrated multimedia of the vehicle.

4. The inspection system of claim 3, wherein
   the communication terminal transmits the phonebook list to the integrated multimedia of the vehicle to determine whether the phonebook is transmitted.

5. The inspection system of claim 3, wherein
   the communication terminal (i) outputs a second inspection speech through the speaker of the docking station in the state in which the communication terminal is paired with the integrated multimedia of the vehicle through the short range wireless communication, (ii) receives the second inspection speech by the microphone of the docking station through the speaker of the vehicle, and (iii) compares the output second inspection speech with the received second inspection speech to determine whether the short range wireless communication is performed.

6. The inspection system of claim 1, wherein
   the wireless connector (i) requests address information of the integrated multimedia of the vehicle, (ii) receives the address information from the integrated multimedia of the vehicle, and (iii) transmits the address information to the communication terminal when the wireless connector receives an address information request of the integrated multimedia of the vehicle from the communication terminal.

7. The inspection system of claim 1, wherein
   the communication terminal receives an identification code of the vehicle through a code recognition unit of the docking station and stores and manages inspection results for each identification code.

8. An inspection managing apparatus for integrated multimedia of a vehicle, comprising:
   a wireless connector mounted in the vehicle;
   a docking station mounted in the vehicle; and
   a communication terminal mounted in the docking station, requesting pairing with the integrated multimedia of the vehicle through a short range wireless communication using the wireless connector, and inspecting the integrated multimedia of the vehicle in a state in which the communication terminal is paired with the integrated multimedia of the vehicle through the short range wireless communication,
   wherein the communication terminal (i) transmits a phonebook list to the integrated multimedia of the vehicle to determine whether the phonebook is transmitted, (ii) outputs a first inspection speech to the integrated multimedia of the vehicle in a call connected state with an arbitrary telephone number in the phonebook list, (iii) determines whether a call sound is transmitted and received based on the first inspection speech, (iv) outputs a second inspection speech to the integrated multimedia of the vehicle in a state in which the communication terminal is paired with the integrated multimedia of the vehicle through the short range wireless communication, and (v) determines whether the short range wireless communication is performed based on the second inspection speech.

9. The inspection managing apparatus of claim 8, wherein
   the docking station includes:
   a main body having a seating part on which the communication terminal is mounted;
   a microphone formed at the main body;
   a speaker formed at the main body; and
   a stand fixing the main body to the vehicle.

10. The inspection managing apparatus of claim 9, wherein
    the docking station further includes a connection terminal which is formed at a lower end of the seating part and connects among the microphone, the speaker, and the communication terminal.

11. The inspection managing apparatus of claim 9, wherein
    the docking station further includes a code recognition unit which is formed at one side of the main body and recognizes an identification code for the vehicle.

12. An inspection method for integrated multimedia of a vehicle by a communication terminal, comprising steps of:
    requesting pairing with the integrated multimedia of the vehicle through a short range wireless communication using a wireless connector;

performing the pairing with the integrated multimedia of the vehicle through the short range wireless communication when the pairing is accepted through the short range wireless communication;

transmitting a phonebook list to the integrated multimedia for the vehicle to determine whether a phonebook is transmitted;

outputting a first inspection speech in a call connected state with an arbitrary telephone number in the phonebook list and determining whether a call sound is transmitted and received based on the first inspection speech;

outputting a second inspection speech to the integrated multimedia of the vehicle through the short range wireless communication and determining whether the short range wireless communication is performed based on the second inspection speech; and releasing the pairing with the integrated multimedia of the vehicle through the short range wireless communication.

13. The inspection method of claim 12, wherein the step of requesting the pairing with the integrated multimedia of the vehicle through short range wireless communication includes steps of:

requesting address information of the integrated multimedia of the vehicle through the wireless connector;

receiving the address information from the integrated multimedia of the vehicle through the wireless connector; and requesting pairing with the integrated multimedia of the vehicle through the short range wireless communication using the address information.

14. The inspection method of claim 12, wherein the step of determining whether the call sound is transmitted and received includes steps of:

outputting the first inspection speech to a microphone of the vehicle;

receiving the first inspection speech from the integrated multimedia of the vehicle through the short range wireless communication;

comparing the output first inspection speech with the received first inspection speech; and determining that the call sound is transmitted and received through the short range wireless communication when the output first inspection speech is the same as the received first inspection speech.

15. The inspection method of claim 12, wherein the step of determining whether the short range wireless communication is performed includes steps of:

transmitting the second inspection speech to the integrated multimedia for the vehicle in the state in which the communication terminal is paired with the integrated multimedia of the vehicle through the short range wireless communication;

receiving the second inspection speech from a speaker of the vehicle;

comparing the output second inspection speech with the received second inspection speech; and determining that the short range wireless communication is performed when the output second inspection speech is the same as the received second inspection speech.

16. The inspection method of claim 12, further comprising a step of, recognizing an identification code of the vehicle prior to the performing of the pairing with the integrated multimedia of the vehicle through the short range wireless communication.

17. The inspection method of claim 12, further comprising a step of, storing an inspection result including at least one of a determination result of whether the phonebook is transmitted, a determination result of whether the call sound is transmitted and received, and a determination result of whether the short range wireless communication is performed after determining whether the short range wireless communication is performed.

18. A non-transitory computer readable medium including instructions which causes a communication terminal to perform the steps of the inspection method of claim 12.

* * * * *